US007670224B2

(12) United States Patent
Williams

(10) Patent No.: US 7,670,224 B2
(45) Date of Patent: Mar. 2, 2010

(54) GAMING APPARATUS WITH POWER SAVING FEATURE

(75) Inventor: Richard C. Williams, Reno, NV (US)

(73) Assignee: IGT, Reno, NV (US)

( * ) Notice: Subject to any disclaimer, the term of this patent is extended or adjusted under 35 U.S.C. 154(b) by 955 days.

(21) Appl. No.: 10/115,532

(22) Filed: Apr. 3, 2002

(65) Prior Publication Data

US 2003/0190949 A1 Oct. 9, 2003

(51) Int. Cl.

| | |
|---|---|
| ***A63F 13/02*** | (2006.01) |
| ***A63F 13/08*** | (2006.01) |
| ***A63F 13/10*** | (2006.01) |
| ***A63F 9/24*** | (2006.01) |
| *A63F 1/00* | (2006.01) |
| *A63F 3/06* | (2006.01) |
| *A63F 5/00* | (2006.01) |
| *G07F 17/34* | (2006.01) |

(52) U.S. Cl. .............................. 463/24; 463/29; 463/43

(58) Field of Classification Search ................... 463/12, 463/13, 16, 17, 18, 20, 22, 23, 25, 26, 27, 463/29, 31, 36, 42, 43, 44, 45, 49, 47, 24; 273/138.2, 143 R, 148 B, 148 R; 714/24; 713/310, 330, 340, 320–324; 340/539.3; 348/333.13

See application file for complete search history.

(56) References Cited

U.S. PATENT DOCUMENTS

| | | | | |
|---|---|---|---|---|
| 4,582,324 A | | 4/1986 | Koza et al. | 273/138 A |
| 4,747,600 A | | 5/1988 | Richardson | 273/269 |
| 4,823,051 A | * | 4/1989 | Young | 315/155 |
| 4,851,987 A | * | 7/1989 | Day | 713/601 |

(Continued)

FOREIGN PATENT DOCUMENTS

| | | |
|---|---|---|
| EP | 0 896 304 | 2/1999 |

(Continued)

OTHER PUBLICATIONS

"The Silicon Gaming Odyssey Slot Machine," Levinthal, et al., IEEE Xplore database, 1063-6390/97, (c) 1997 IEEE, pp. 296-301.*

(Continued)

*Primary Examiner*—Peter DungBa Vo
*Assistant Examiner*—Matthew D. Hoel
(74) *Attorney, Agent, or Firm*—Weaver Austin Villeneuve & Sampson LLP

(57) ABSTRACT

A gaming apparatus may include a display unit capable of generating video images, a detection apparatus capable of detecting the presence of a person by detecting radiation from the person, and a controller operatively coupled to the display unit and said detection device. The controller may comprise a processor and a memory and may be programmed to allow a person to make a wager, to cause a video image representing a video gambling game to be generated on the display unit, to determine an outcome of the video gambling game and a value payout associated with the outcome of the video gambling game, and to cause the gaming apparatus to enter a sleep mode after no detection of a person for a period of time, and to cause the gaming apparatus to terminate the sleep mode upon detection of a person.

16 Claims, 16 Drawing Sheets

U.S. PATENT DOCUMENTS

| | | | | | |
|---|---|---|---|---|---|
| 4,873,469 | A | * | 10/1989 | Young et al. | 315/155 |
| 4,980,836 | A | * | 12/1990 | Carter et al. | 713/322 |
| 5,083,266 | A | * | 1/1992 | Watanabe | 713/601 |
| 5,548,764 | A | * | 8/1996 | Duley et al. | 713/310 |
| 5,675,810 | A | * | 10/1997 | Sellers | 713/323 |
| 5,919,263 | A | * | 7/1999 | Kikinis et al. | 713/320 |
| 5,950,037 | A | * | 9/1999 | Ko | 399/38 |
| 5,983,357 | A | * | 11/1999 | Sun | 713/324 |
| 5,986,357 | A | * | 11/1999 | Myron et al. | 307/116 |
| 6,122,678 | A | * | 9/2000 | Eckel et al. | 710/15 |
| 6,124,692 | A | | 9/2000 | Canada et al. | 318/490 |
| 6,158,012 | A | | 12/2000 | Watts, Jr. | 713/322 |
| 6,173,409 | B1 | | 1/2001 | Watts, Jr. et al. | 713/322 |
| 6,216,235 | B1 | | 4/2001 | Thomas et al. | 713/501 |
| 6,256,742 | B1 | | 7/2001 | Konaka et al. | 713/320 |
| 6,260,150 | B1 | | 7/2001 | Diepstraten et al. | 713/323 |
| 6,308,278 | B1 | * | 10/2001 | Khouli et al. | 713/323 |
| 6,353,599 | B1 | | 3/2002 | Bi et al. | 370/328 |
| 6,361,437 | B1 | * | 3/2002 | Walker et al. | 463/23 |
| 6,367,020 | B1 | * | 4/2002 | Klein | 726/26 |
| 6,397,340 | B2 | | 5/2002 | Watts, Jr. et al. | 713/322 |
| 6,418,536 | B1 | * | 7/2002 | Park | 713/323 |
| 6,445,301 | B1 | * | 9/2002 | Farrell et al. | 340/573.2 |
| 6,577,825 | B1 | * | 6/2003 | Gonnella et al. | 399/38 |
| 6,636,026 | B1 | * | 10/2003 | Nomoto | 323/318 |
| 6,665,805 | B1 | * | 12/2003 | Tsirkel et al. | 713/323 |
| 6,680,878 | B1 | * | 1/2004 | Minabe et al. | 369/24.01 |
| 6,713,975 | B2 | * | 3/2004 | Yamauchi et al. | 315/308 |
| 6,851,066 | B2 | * | 2/2005 | Obitsu | 713/323 |
| 7,010,710 | B2 | * | 3/2006 | Piazza | 713/323 |
| 7,117,380 | B2 | * | 10/2006 | Kangas | 713/320 |
| 2001/0031658 | A1 | * | 10/2001 | Ozaki et al. | 463/16 |
| 2002/0032877 | A1 | * | 3/2002 | Iwaki | 713/320 |
| 2002/0050799 | A1 | * | 5/2002 | Yamauchi et al. | 315/307 |
| 2002/0063217 | A1 | * | 5/2002 | Barone | 250/349 |
| 2003/0051179 | A1 | * | 3/2003 | Tsirkel et al. | 713/300 |
| 2003/0051182 | A1 | * | 3/2003 | Tsirkel et al. | 713/320 |
| 2003/0122810 | A1 | * | 7/2003 | Tsirkel et al. | 345/207 |
| 2004/0081337 | A1 | * | 4/2004 | Tsirkel et al. | 382/118 |
| 2004/0175020 | A1 | * | 9/2004 | Bradski et al. | 382/103 |
| 2005/0034147 | A1 | * | 2/2005 | Best et al. | 725/10 |

FOREIGN PATENT DOCUMENTS

| | | | | |
|---|---|---|---|---|
| EP | 0 945 837 | A2 | * | 9/1999 |
| EP | 0 945 837 | A2 | * | 1/2001 |
| JP | 11-216266 | | | 10/1999 |
| JP | 2000-24227 | | | 1/2000 |
| JP | 2000-271324 | | | 10/2000 |
| JP | 2001-293252 | | | 10/2001 |

OTHER PUBLICATIONS

LHI874 motion sensor datasheet, downloaded Oct. 13, 2009 from http://www.datasheetcatalog.org/datasheet/perkinelmer/LHI874.pdf.*

Communication from the Great Britain Patent Office dated Jul. 31, 2003 enclosing a Search Report dated Jul. 30, 2003.

Office Action issued in Australian Application No. 2003203431 on Mar. 4, 2005.

"Reduce Your Computer Monitor's Energy Use by 95%," Lanny Joyce, Faces & Places—Cornell's Administration, Facilities and Finance Newsletter (Fall 2002, USA).

"How Much Power Does Your PC Consume?," Manfred Grisebach, University of Waterloo—Information Systems & Technology (Aug. 20, 2003, Canada).

Office Action issued in counterpart Australian Application No. 200303431 on Sep. 15, 2005.

* cited by examiner

FIG. 10
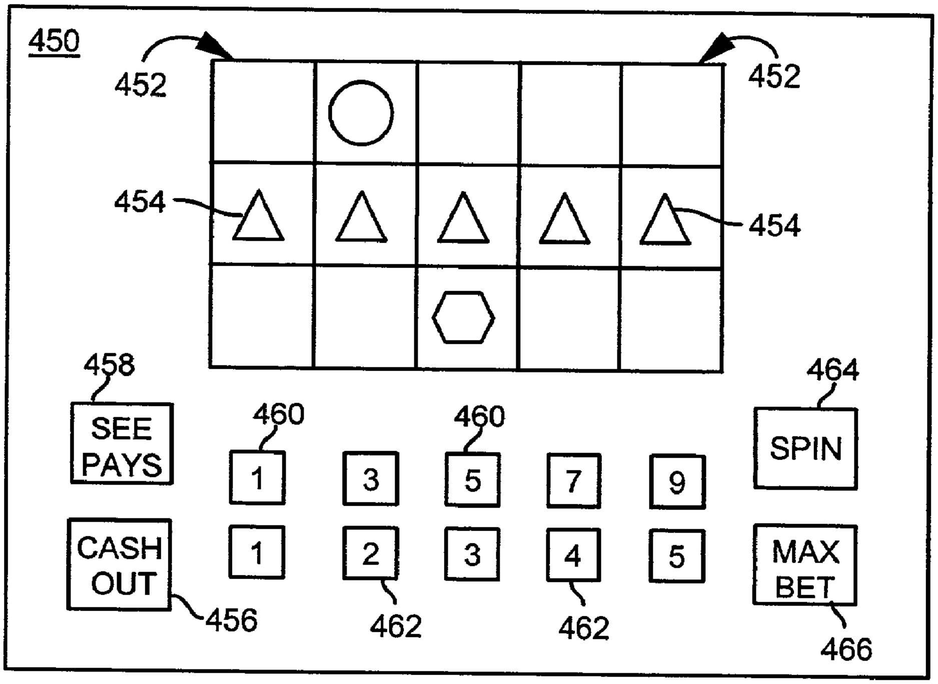
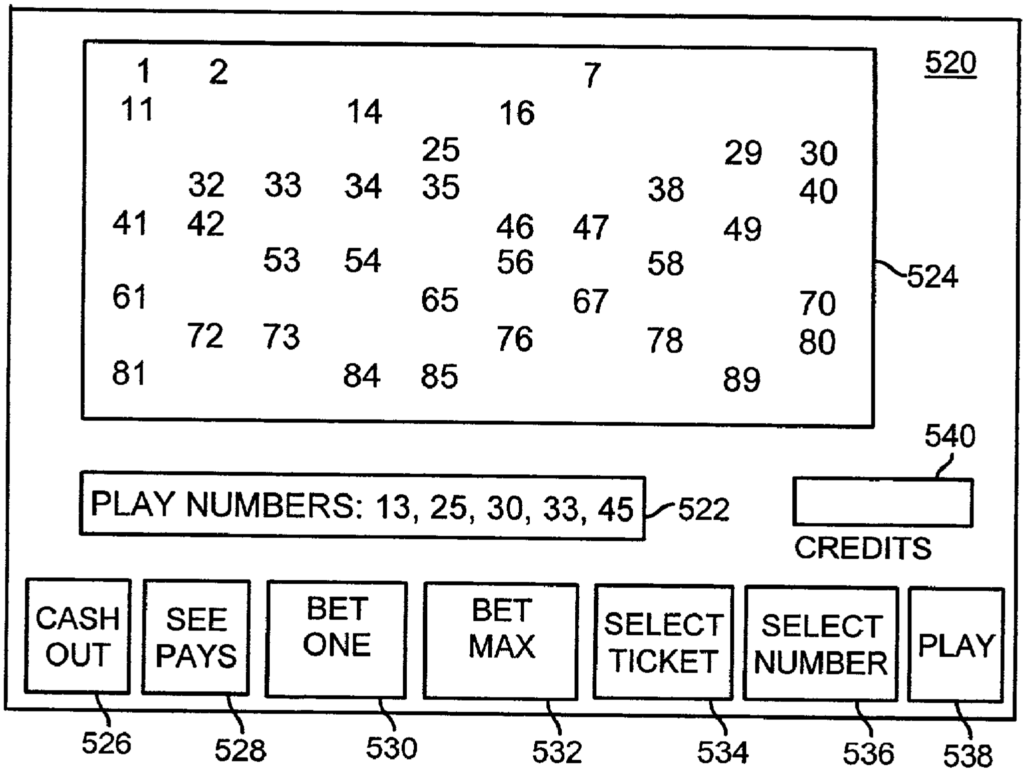
FIG. 11

GAMING APPARATUS WITH POWER SAVING FEATURE

BACKGROUND OF THE INVENTION

The present invention is directed to a gaming apparatus, which could be either an individual gaming unit or a gaming system having a plurality of gaming units, that is capable of shifting into a power-saving sleep, mode.

A conventional gaming unit has been provided with a display unit that is capable of generating video images, a coin or bill acceptor, and a controller with a memory and a processor that controls the overall operation of the gaming unit. The controller was programmed to allow a person to make a wager, to cause video images to be generated on the display unit, to determine an outcome of the video gambling game, and to determine a value payout associated with the outcome of the video gambling game. The conventional gaming unit was programmed to display video images representing a video gambling game, which included a number of user-selectable video gambling games including video poker, video blackjack, video slots, video keno and video bingo.

The conventional gaming unit was also programmed to cause a screen-saver sequence to be performed on the display unit. The screen-saver sequence included a plurality of video images relating to the game without the generation of sound. The gaming unit would periodically exit the screen-saver sequence to perform an attract sequence, which included a plurality of video images and the generation of one or more sound segments that were designed to attract a player to the gaming unit. If a player deposited a coin or a bill or made another input to the gaming unit during performance of the attract sequence, the gaming unit would termination the attract sequence and generate another display, such as a game-selection display, to allow the player to begin gambling. The conventional gaming unit also included an instruction sequence that included a plurality of help displays that could be displayed in response to the player pressing a "help" key or similar key.

SUMMARY OF THE INVENTION

In one aspect, the invention is directed to a gaming apparatus that may include a display unit capable of generating video images, a detection apparatus capable of detecting the presence of a person without physical contact between the gaming apparatus and the person, and a controller operatively coupled to the display unit and the detection apparatus. The controller may comprise a processor and a memory and may be programmed to allow a person to make a wager, to cause a video image representing a video gambling game to be generated on the display unit, to determine an outcome of the video gambling game and a value payout associated with the outcome of the video gambling game, to cause the gaming apparatus to enter a sleep mode after no detection of a person for a period of time, and to cause the gaming apparatus to terminate the sleep mode upon detection of the person.

The video image may represent a game selected from the group of video gambling games consisting of video poker, video blackjack, video slots, video keno and video bingo, in which case the video image may comprise an image of at least five playing cards if the game is video poker, the video image may comprise an image of a plurality of simulated slot machine reels if the game is video slots, the video image may comprise an image of a plurality of playing cards if the game is video blackjack, the video image may comprise an image of a plurality of keno numbers if the game is video keno, and the video image may comprise an image of a bingo grid if the game is video bingo.

The controller may be programmed to cause a color video display unit of the gaming apparatus to power down in response to entering the sleep mode. Similarly, the controller may be programmed to cause a video driver(s), a fluorescent light(s), and a hard drive of the gaming unit to power down in response to entering the sleep mode. In addition, the controller may be programmed to cause the hard drive, the fluorescent light(s), the video driver(s), and the color video display unit of the gaming unit to power up in response to terminating the sleep mode. Further, the controller may be programmed to cause the gaming apparatus to enter the sleep mode when the period of time is equal to a predetermined time duration, and the controller may also be programmed to cause the controller to allow an operator to adjust the predetermined time duration.

The detection apparatus may comprise a detection apparatus that is capable of directing radiation towards a person and detecting radiation from the person, and the detection apparatus may comprise a detection apparatus that is capable of detecting when a person is within a given distance of the gaming apparatus.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. § 112, sixth paragraph.

Figure 1:
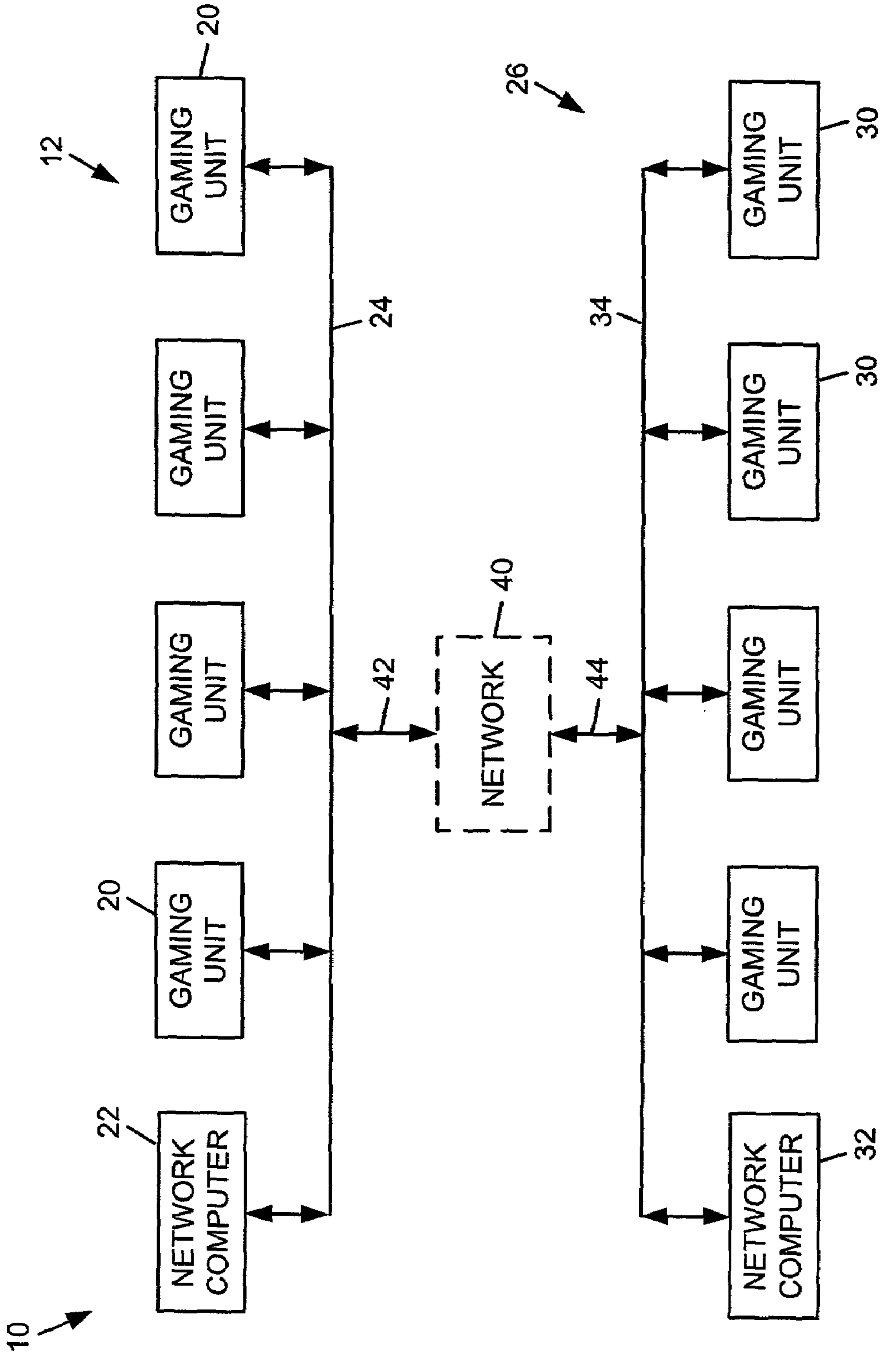
FIG. 1 is a block diagram of an embodiment of a gaming system in accordance with the invention.

FIG. 1 illustrates an embodiment of a gaming system 10 in accordance with the invention. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first gaming. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
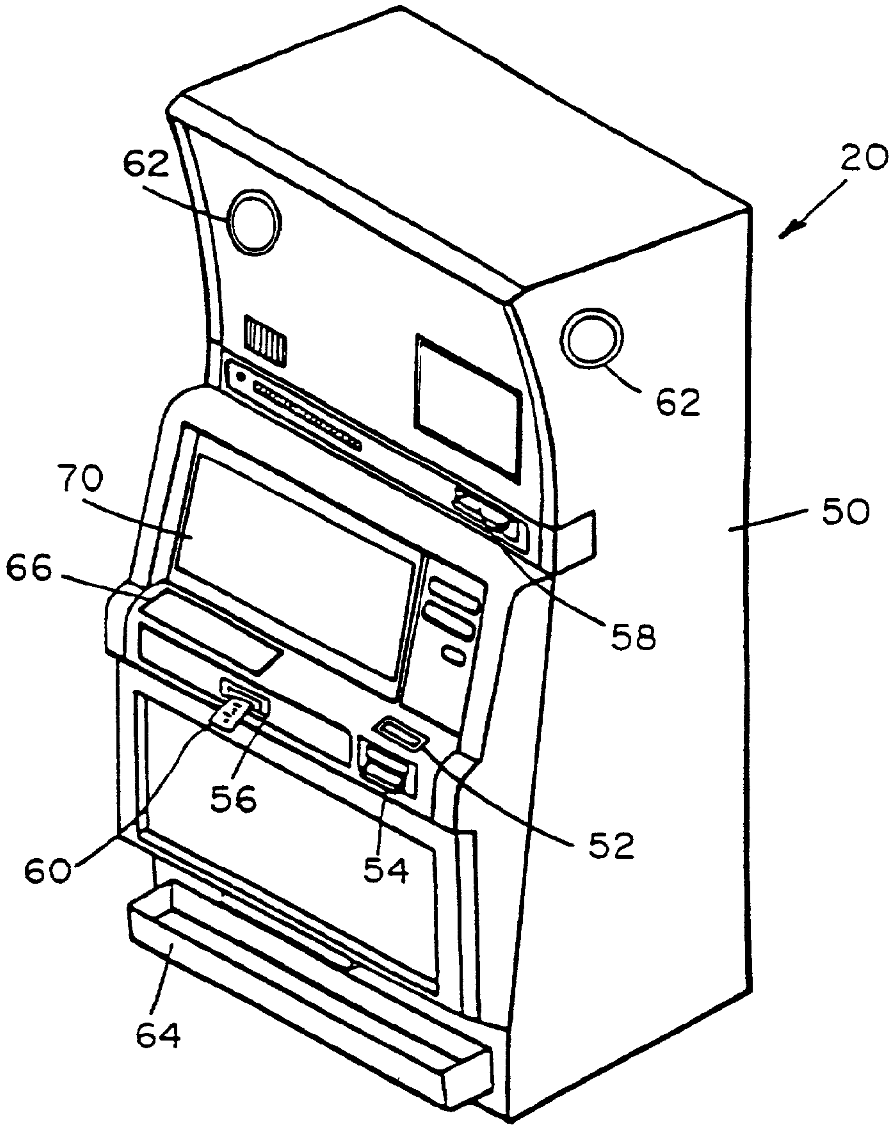
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
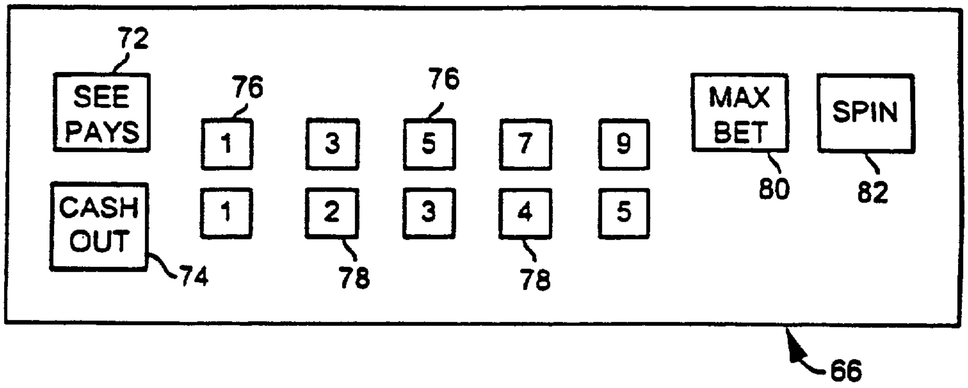
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
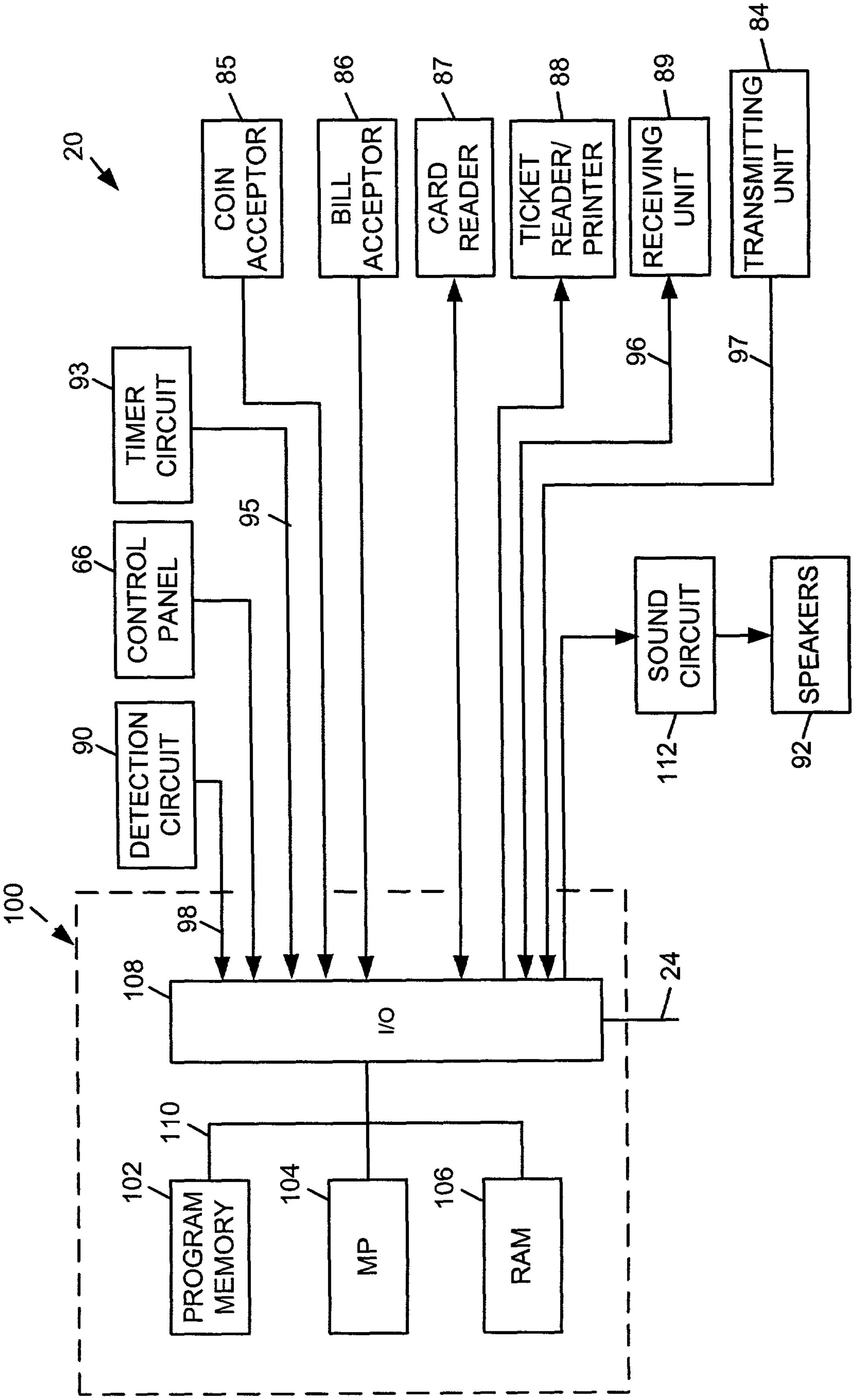
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

FIG. 3 illustrates that the control panel 66, the coin acceptor 85, the bill acceptor 86, the card reader 87 and the ticket reader/printer 88 may be operatively coupled to the I/O circuit 108, each of those components being so coupled by either a unidirectional or bidirectional, single-line or multiple-line data link, which may depend on the design of the component that is used. The speaker(s) 92 may be operatively coupled to a sound circuit 112, that may comprise a voice- and sound-synthesis circuit or that may comprise a driver circuit. The sound-generating circuit 112 may be coupled to the I/O circuit 108.

In addition, FIG. 3 illustrates that a detection circuit 90, a timer circuit 93, a receiving unit 89, and a transmitting unit 84 may be operatively coupled to the I/O circuit 108, each of those components being so coupled by either a unidirectional or bidirectional, single-line or multiple-line data link, which may depend on the design of the component that is used. For example, the detection circuit 90 may be coupled to the I/O circuit 108 via a multi-signal line 98.

As shown in FIG. 3, the components 84, 85, 86, 87, 88, 89, 90, 91, 93 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Detection Circuits

As shown in FIG. 3, detection may be accomplished through physical contact between the player and the gaming unit 20, for example, when the player inserts a coin into the gaming unit 20. Detection may also be accomplished using the detection circuit 90 which does not require physical contact between the player and the gaming unit 20. The detection circuit 90 may detect the presence of a stationary person or a moving person, and/or the direction in which the person is moving. The detection circuit 90 may be any type of detection circuit, such as an ultrasonic detection circuit, an infrared detection circuit, a Doppler detection circuit, etc. The detection circuit 90 may operate based on sensing radiation from a person, in which case the detection circuit may transmit a beam towards a person and detected radiation reflected from the person or in which case the detection circuit may sense radiation from person without transmitting radiation towards the person. As used herein, the term "radiation" is intended to be broadly construed to include, but not be limited to, heat, visible light, non-visible light, infrared and ultrasonic waves, acoustic energy, etc.

Figure 4:
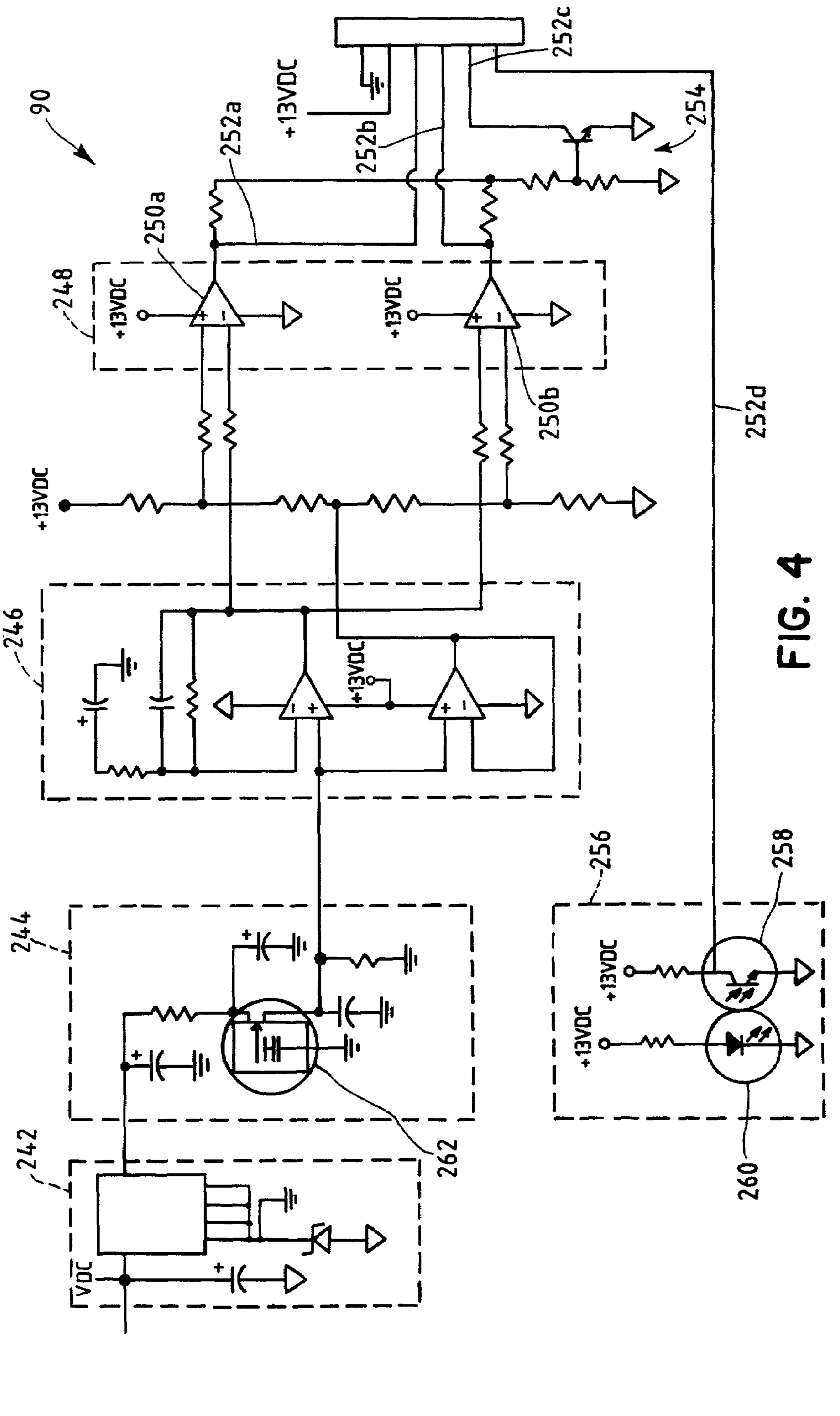
FIG. 4 is a circuit diagram of an embodiment of a detection circuit shown schematically in FIG. 3.

FIG. 4 is a circuit diagram of one possible embodiment of the detection circuit 90 shown schematically in FIG. 3. Referring to FIG. 4, the detection circuit 90 may include a circuit 256 that is capable of detecting the presence of a non-moving person. For example, the circuit 256 may detect when a person is within a predetermined distance of the gaming unit 20, when a person is standing in front of the gaming unit 20, and/or when a person is seated in front of the gaming unit 20. The detection circuit 256 may include an infrared LED 260 that emits infrared radiation from the front of the gaming unit 20 and a photodetector 258 that generates a signal on a line **252*d*** in response to detecting radiation of an intensity greater than a given threshold.

The detection circuit 90 may also include a circuit (shown in the upper half of FIG. 4) that is capable of detecting the presence and movement of a person and the direction in which the person is moving. That circuit may include a power supply circuit 242, such as a regulated power supply circuit, a detector circuit 244, an amplifier/buffer circuit 246, and a comparator circuit 248.

The detection circuit 90 may include a motion detector 262, such as a model LH1878 motion detector marketed by EG&G Heimann. That particular motion detector has a first field of vision (e.g. a right-hand field of vision) and a second field of vision (e.g. a left-hand field of vision), and two capacitive elements that are sensitive to temperature, one element for the right field of vision and one element for the left field of vision. That detector generates a positive pulse in response to detecting a person in one of its fields of vision and a negative pulse in response to detecting a person in the other of its fields of vision. Thus, the detector is capable of detecting the stationary presence of a person in one of its fields of vision and movement of a person from one of its fields of vision to the other. The response of that Heimann detector is such that it is not capable of detecting relatively quick movement of a person, such as a person walking quickly by the gaming unit 20. The amplifier circuit 246 may be provided with a relatively high AC gain and a relatively low DC gain to reject the situation where a person is detected but is not moving. The amplifier circuit 246 may act as a bandpass filter to cause frequencies outside of a bandpass range to be filtered out.

The comparator circuit 248 may be provided with a first comparator **250*a* designed to detect the presence of a pulse of one polarity (e.g. positive), which would correspond to the detection of a person in one field of vision of the Heimann detector, and a second comparator 250*b*** designed to detect the presence of a pulse of opposite polarity (e.g. negative), which would correspond to the detection of a person in the other field of vision of the Heimann detector.

The output of the comparator **250*a* may generate on a line 252*a* a signal indicating the detection of a person in one field of vision of the Heimann detector, and the output of the comparator 250*b* may generate on a line 252*b* a signal indicating the detection of a person in the other field of vision of the Heimann detector. By comparing which of the signals is generated first, the controller 100 of the gaming unit 20** may determine the direction in which the person is moving.

The signals generated by the comparators **250*a*, 250*b* may be provided to an OR circuit 254 that determines when either of the comparators 250*a*, 250*b* generates a signal on one of the lines 252*a*, 252*b*, in which case the OR circuit 254 generates a signal indicating the detection of a person on a line 252*c***.

Figure 4A:
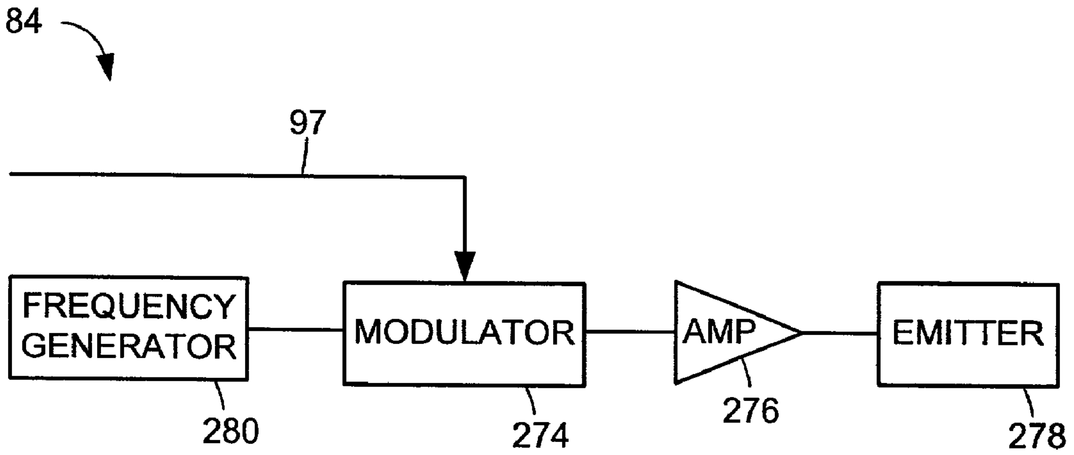
FIG. 4A is a block diagram of one embodiment of a transmitting unit showed schematically in FIG. 3.

Referring to FIG. 3, instead of or in addition to the detection circuit 90, the gaming unit 20 may include a detection circuit having a transmitting unit 84, which may be coupled to the I/O circuit 108 via a line 97. Referring to FIG. 4A, the transmitting unit 84 may include a frequency generator 280, a modulator circuit 274, an amplifier circuit 276 and a radiation emitter 278. The modulator circuit 274, which may be controlled by the gaming unit controller 100 via the line 97, may change the frequency (divide up or down) generated by the frequency generator 280 and may control when the output of the frequency generator 280 is transmitted to the amplifier circuit 276.

Figure 4B:
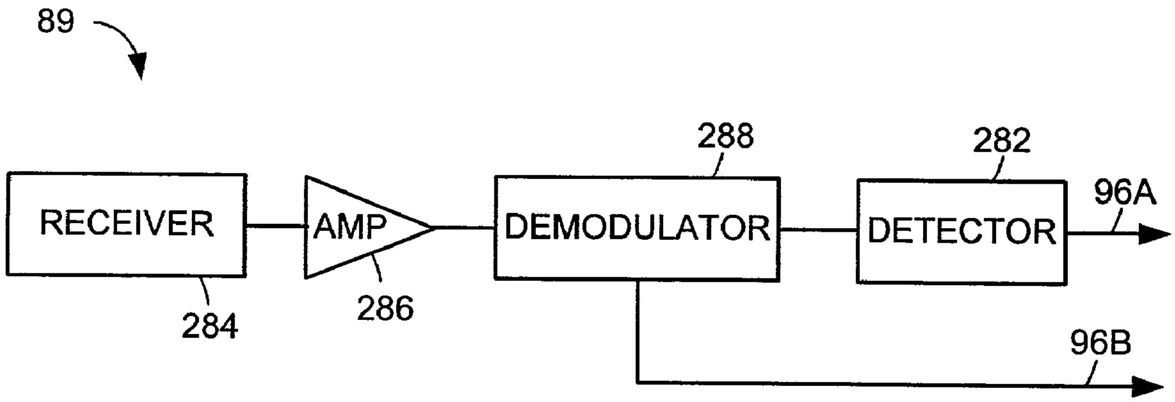
FIG. 4B is a block diagram of one embodiment of a receiving unit showed schematically in FIG. 3.

Referring to FIG. 3, the detection circuit described above may include a receiving unit 89, which may be coupled to the I/O circuit 108 via a multi-wire line 96. Referring to FIG. 4B, the receiving unit 89 may include a transducer or receiver 284 capable of detecting radiation received from or reflected from a person, an amplifier circuit 286, a demodulator circuit 288 which may be controlled by the gaming unit controller 100 via a line 96*b*, and a detector circuit 282 that may generate a person detect signal, a person-moving signal, and/or a movement direction signal to the gaming unit controller 100 via a line 92*a*. The emitter 278 and the receiver 284 may be of various designs and constructions, such as infrared, ultrasonic, Doppler, acoustic, etc.

The transducer components of the detection circuits described above that emit and detect radiation, such as the components 260, 258, 262, 278, 284, may be mounted to a front housing portion of the gaming unit 20 in order to detect the presence of persons walking or positioned, such as sitting or standing, in front of the gaming unit 20. The components may be mounted behind a plate of glass or another structure that does not significantly impair their operation.

Timer Circuit 93

As shown in FIG. 3, the gaming unit 20 may also include the timer circuit 93, which may be coupled to the I/O circuit 108 via a multi-signal line 95. The timer circuit 93, responsive to the detection circuit 90 via the controller 100, may cause the gaming unit 20 to go into a power-saving, or "sleep" mode, after a predetermined period of time has elapsed where no player has been detected.

The timer circuit 93 may be any type of timer circuit configured to be responsive to the detection circuit 90. Preferably, the timer circuit 93 may operate in response to the detection circuit 90 detecting the absence of a player. The absence of a player may be determined directly from the detection circuit 90. For example, the detection device may not detect radiation emitted from a player, indicating that a player is not in the vicinity of gaming unit 20. In the alternate, the absence of a player may be determined by lack of player contact with the gaming unit itself. For example, if a player has not deposited value in any of the possible value input devices or has not engaged any buttons, it may be assumed that a player is not in the vicinity of the gaming unit 20.

When it is determined that a player is not detected, the controller 100 may cause the timer circuit 93 measure a time period. The time period may begin as soon as it is determined that no player is detected, or the time period may begin shortly after it has been determined that no player is detected, for example, ten minutes after the last player input has been detected. The controller 100 compares the time period measured by the timer circuit 93 to a predetermined time duration. When the time period in which no player is detected equals the predetermined time duration, for example 30 minutes, the controller 100 causes the gaming unit 20 to go into the sleep mode. The sleep mode begins with the color video display unit powering down, thereby terminating any attract sequence that may be on the screen. Next, the video driver(s) are power down, followed by the fluorescent lights, and any hard drives, if the gaming unit 20 is computer driven. The predetermined period of time may be fixed and selected by the casino operator or may be varied throughout the day by controller 100.

Figure 5A:
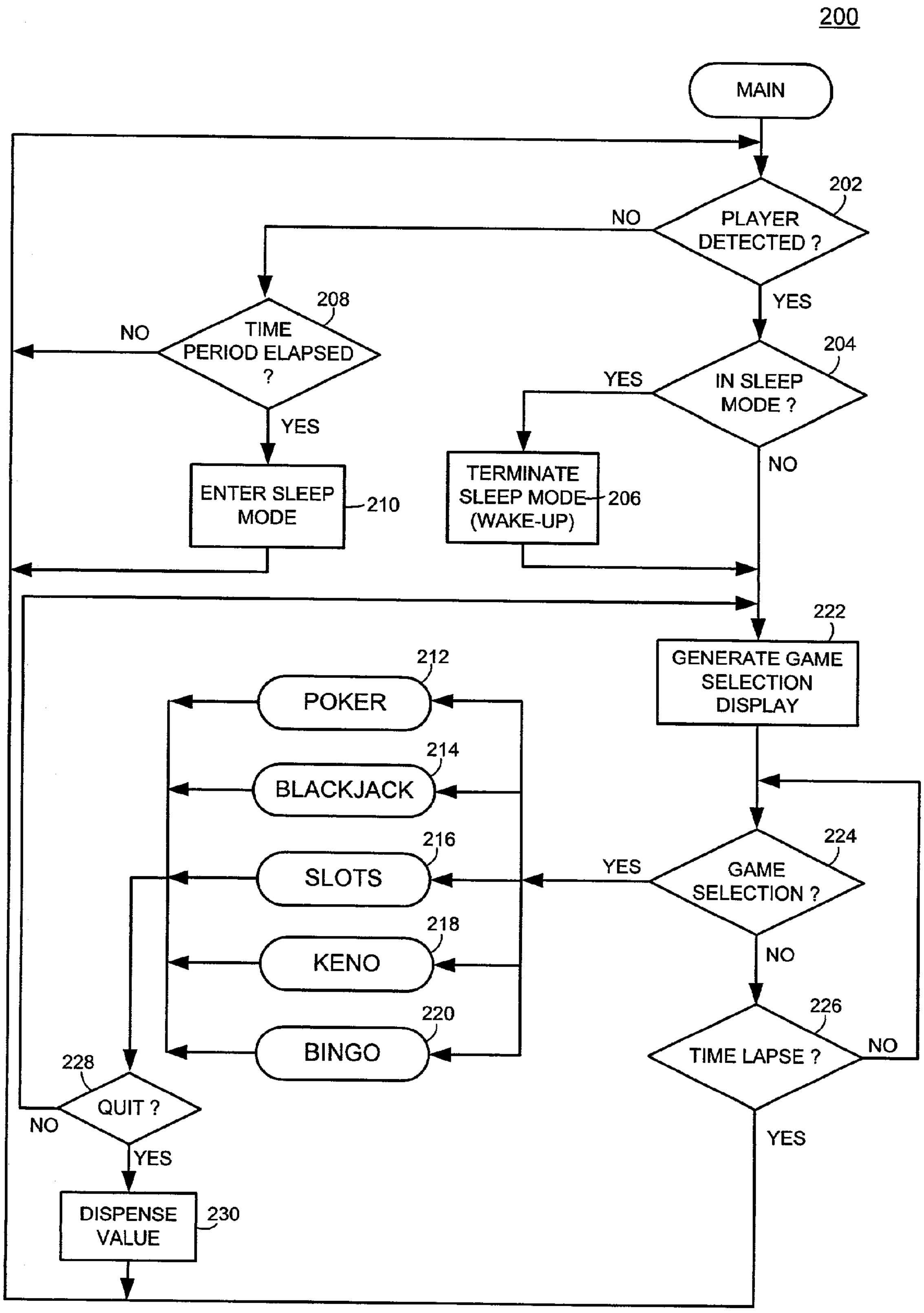
FIG. 5A is a flowchart of a main routine that may be performed by the controller shown in FIG. 3.

FIG. 5A is a flowchart of a main operating routine 200 that may be stored in the memory of the controller 100. The main routine 200 may begin operation at block 202 which may determine whether the presence of a player has been detected by any of the means described above. For example, a person may be strolling to, sitting or standing directly in front of, or making physical contact with the gaming unit 20.

Figure 5B:
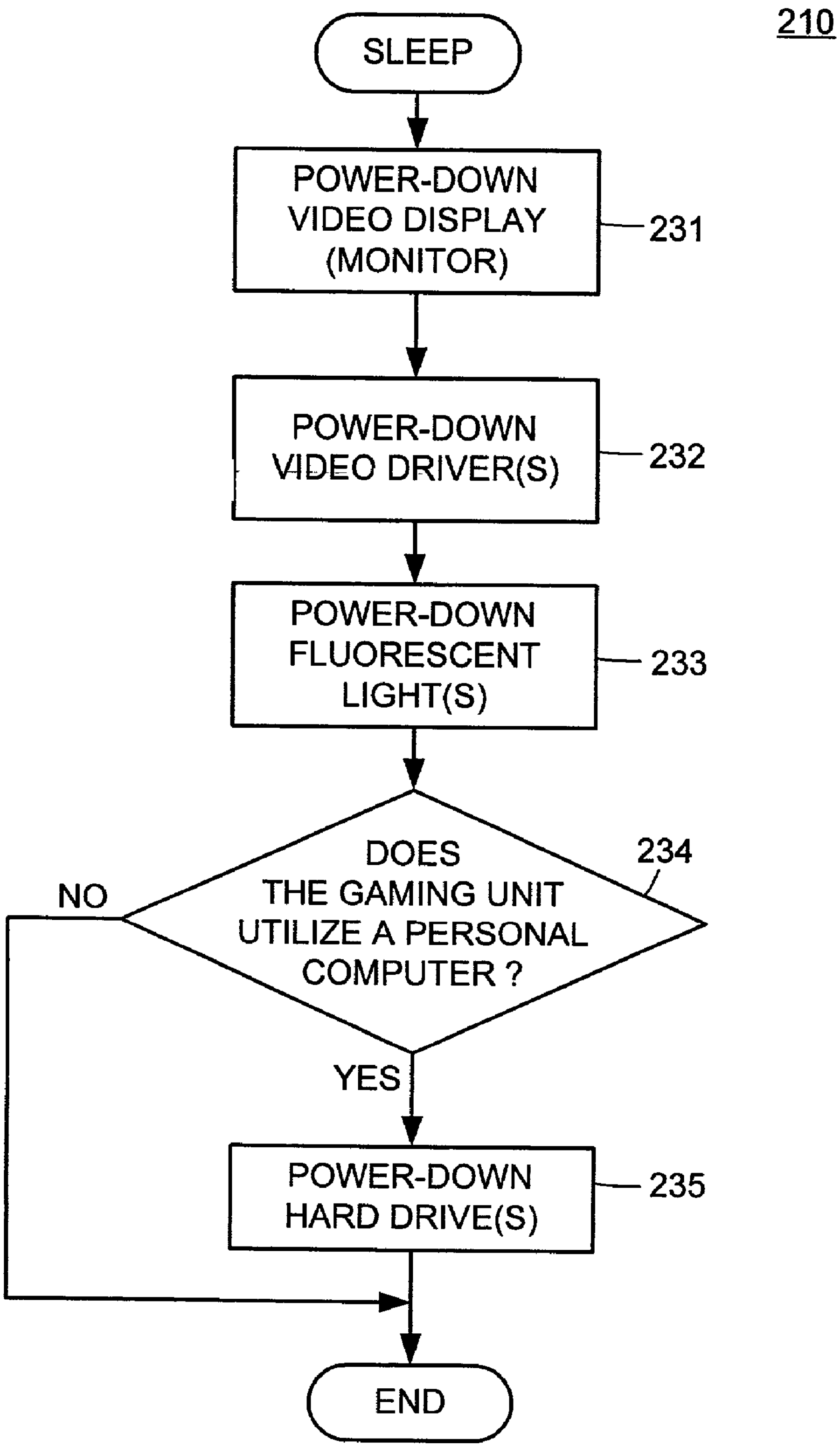
FIG. 5B, is a flowchart of a sleep routine that may be performed by the controller shown in FIG. 3.

In the case that a player not is detected, the controller 100, using time period information from the timer circuit 93, determines if the predetermined time value has been reached at block 208. In addition to detecting the absence of a player, the time period may also include a time period in which no input of any type has been received by the gaming unit 20. If the time period, as measured by the timer circuit 93 reaches the predetermined time value, the controller 100 causes the gaming unit 20 to go into the sleep mode at block 210. Referring to FIG. 5B, a flowchart of a sleep routine 210, stored in the memory of the controller 100, may be implemented when the gaming unit 20 is directed to a sleep mode. While in the sleep mode, the gaming unit 20 requires approximately 50 percent of its normal operating power. While in a screen-saver mode, however, the gaming unit 20 requires 100 percent of its normal operating power and therefore does not result in any power savings for the gaming unit 20.

Referring to FIG. 5B, the sleep routine may begin operation at block 231 where the monitor, or the color video display 70, of gaming unit 20 is powered-down. Upon power down, the color video display 70 does not generate an attraction sequence, a game-selection display, or even screen saver program. In addition, voice and/or music is no longer generated by the speakers 92. Upon completion of the powering-down of the color video display 70, the video power drivers of gaming unit 20 are powered down at block 232. Similarly, the fluorescent lights (not shown) of the gaming unit 20 are powered down at block 233. If the gaming unit 20 does not utilize a personal computer, the sleep routine 210 is complete. If, however, the gaming unit 20 does utilize a personal computer, the hard drives of the computer are powered down at block 235.

Referring back to FIG. 5A, if the time period, as measured by the timer circuit 93 does not reach the predetermined time value, an attraction sequence or a screen-saver sequence may be invoked or be continued until a player is detected or the time period reaches the predetermined time value.

Figure 5C:
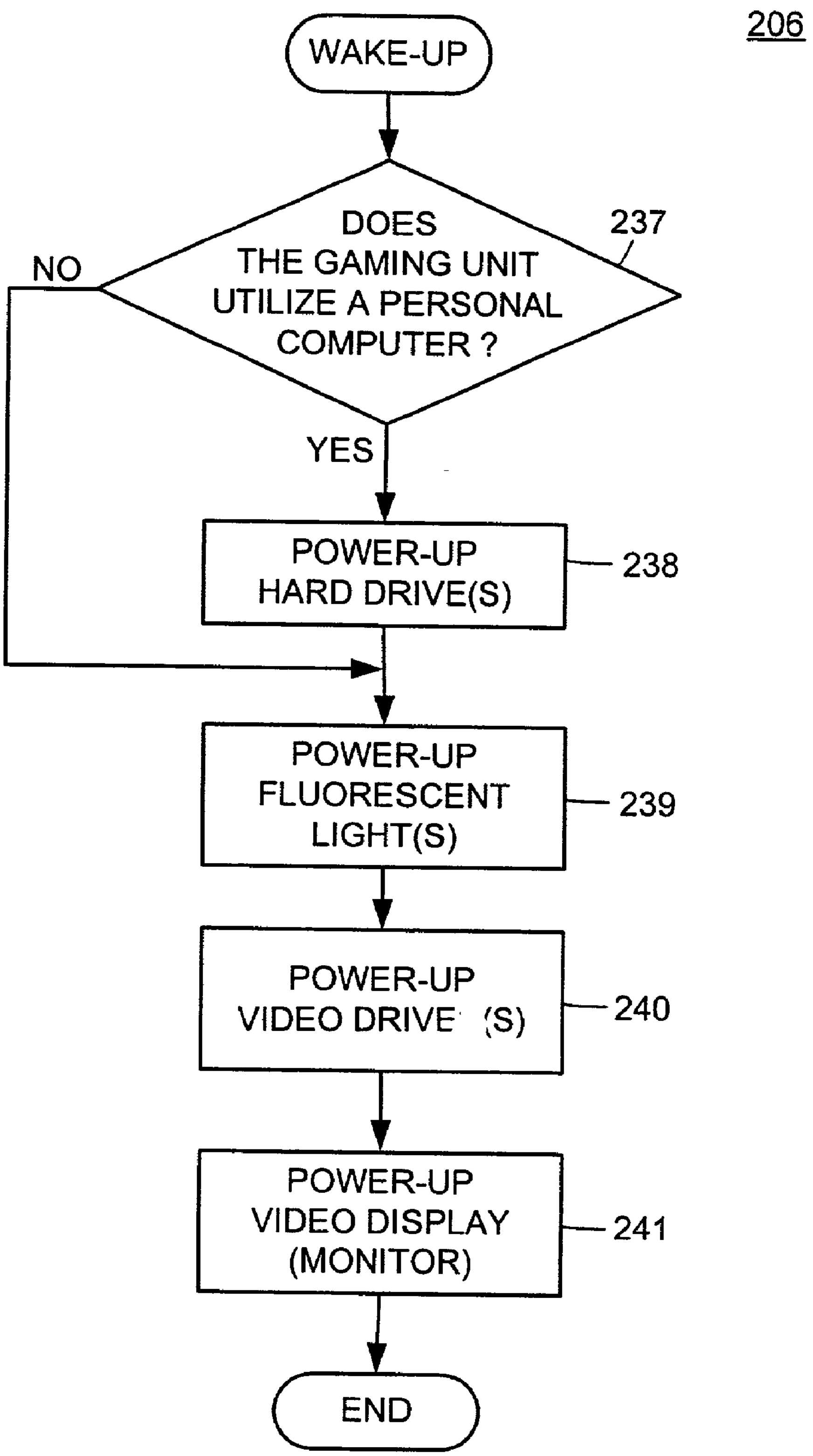
FIG. 5C, is a flowchart of a wake-up routine that may be performed by the controller shown in FIG. 3.

Returning back to block 202, in the case that a player is detected, the controller 100 determines if the gaming unit 20 is in the sleep mode, at block 204. If the gaming unit 20 is already in the sleep mode as determined at block 204, the controller 100 causes the sleep mode to be terminated at block 206. Termination of the sleep mode may be referred to herein as the "wake-up" mode. Referring to FIG. 5C, a flowchart of a wake-up routine 206, stored in the memory of the controller 100, may be implemented when the gaming unit 20 terminates from the sleep mode. Referring to FIG. 5C, the wake-up routine may begin operation at block 237. If the gaming unit 20 utilizes a personal computer, as determined at block 237, the hard drives of the gaming unit 20 are power-up at block 238. If, however, the gaming unit 20 does not utilize a personal computer, as determined at block 237, the wake-up routine moves directly to block 239 where the fluorescent lights of the gaming unit 20 are powered-up. Similarly, the video drivers of the gaming unit 20 are powered up at block 240, followed by the powering-up of the color video display 70, or monitor, at block 241. The termination of the power saving sleep mode is complete following the powering-up of the monitor. Referring to FIG. 5A, upon termination of the sleep mode, a game-selection display may be generated on the color video display 70 at block 222.

In response to the game-selection display generated at block 222, the gaming unit 20 may wait for the person to make a game selection. Upon selection of one of the games by the person as determined at block 224, the controller 100 may cause one of a number of gaming game routines to be performed to allow the player to play the selected game. For example, the game routines could include a video poker routine 212, a video blackjack routine 214, a video slots routine 216, a video keno routine 218, and a video bingo routine 220.

If no selection is made within a given period of time as determined at block 226, the operation may branch back to block 224.

It should be noted that although five video gaming routines are shown in FIG. 5A, a different number of routines could be included to allow play of a different number of gambling games. Alternatively, the gaming unit 20 may be programmed to allow play of only one type of gaming game. The gaming unit 20 may also be programmed to allow play of different games, such as a slot machine with mechanical wheels.

After one of the routines 212, 214, 216, 218, and 220 has been performed to allow the player to play one of the games, block 228 may be utilized to determine whether the player wishes to terminate play on the gaming unit 20 or to select another game. If the player wishes to stop playing the gaming unit 20, which wish may be expressed, for example, by selecting a quit graphic displayed on the color video display unit 70 or through another input device, the controller 100 may dispense value to the player at block 230, based on the outcome of the games played by the player. The operation may then return to block 202 to start the main routine 200 again. If the player did not wish to quit as determined at block 228, the program may branch back to block 222 where the game-selection display may again be generated to allow the player to select another game.

Video Poker

Figure 6:
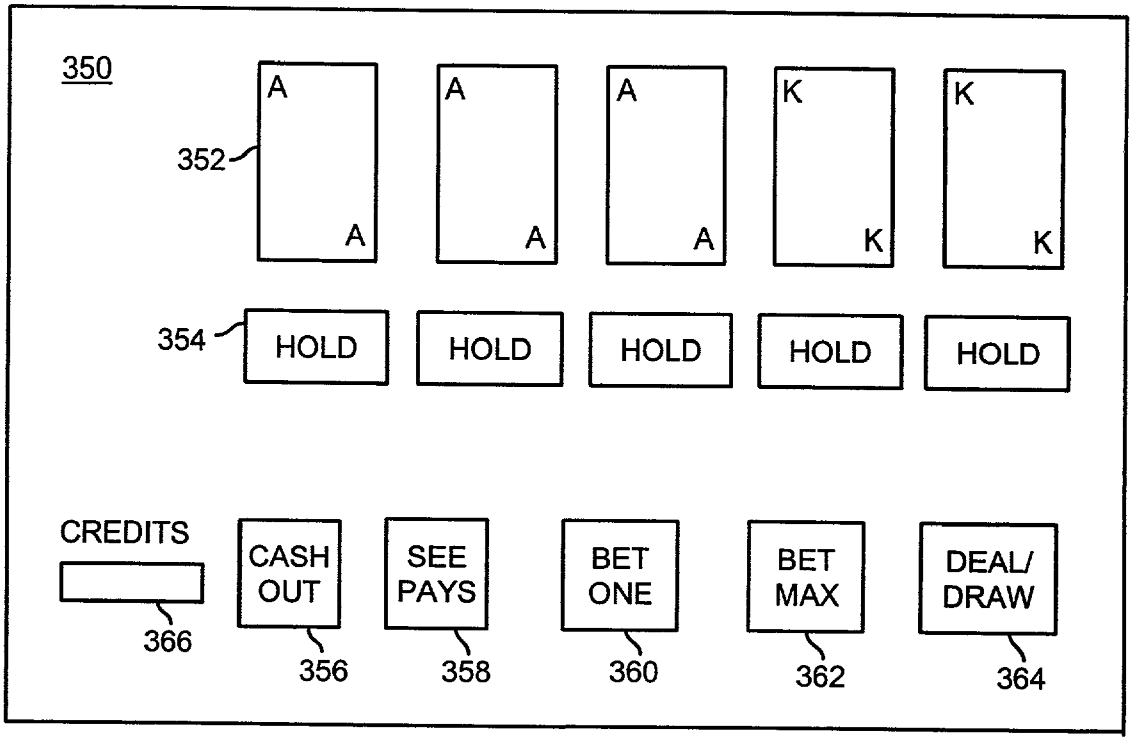
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 212 shown schematically in FIG. 5A. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
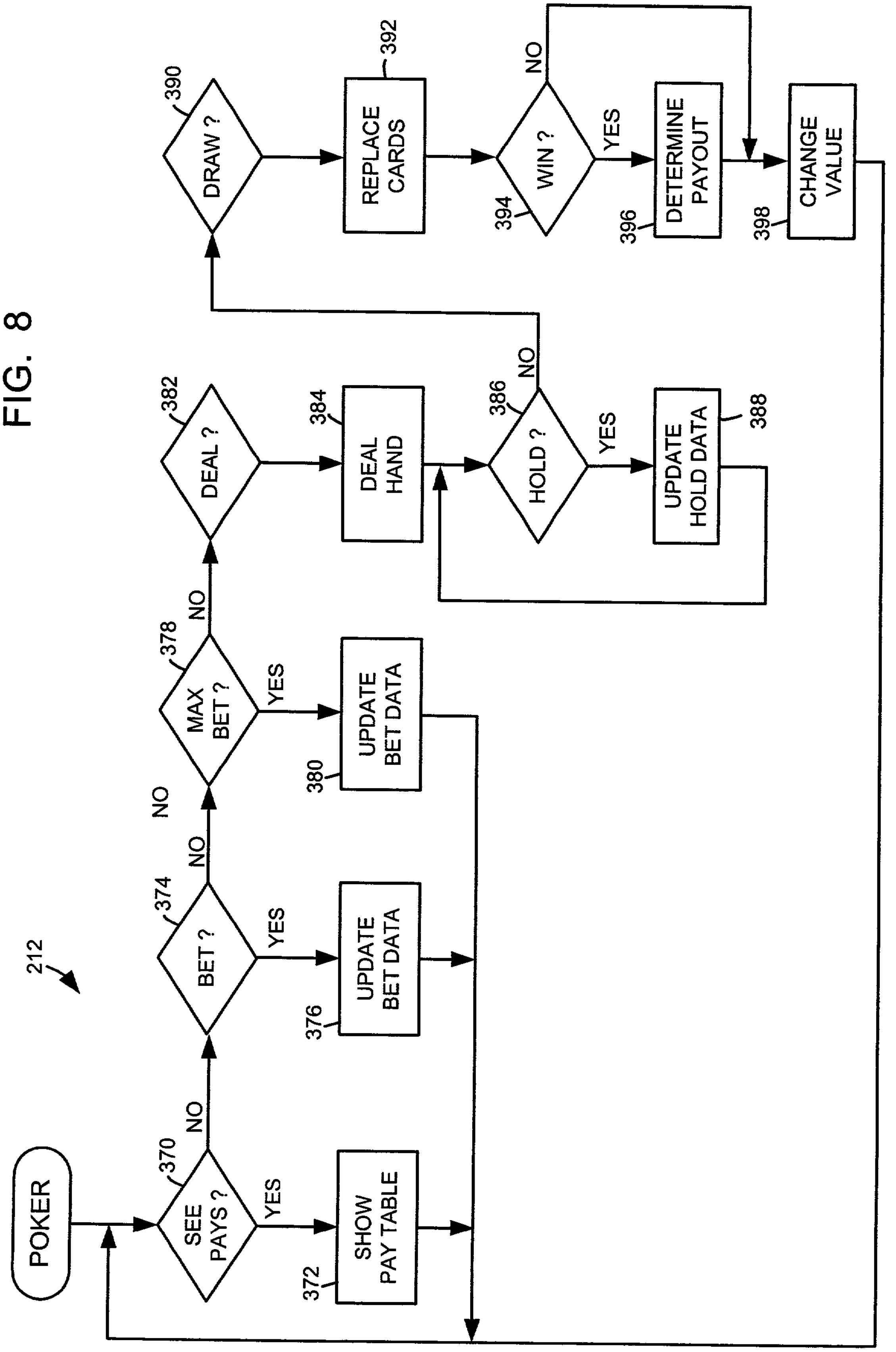
FIG. 8 is a flowchart of an embodiment of a video poker routine that may be performed by one or more of the gaming units.

FIG. 8 is a flowchart of the video poker routine 212 shown schematically in FIG. 5A. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352 After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 212 is described above in connection with a single poker hand of five cards, the routine 212 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
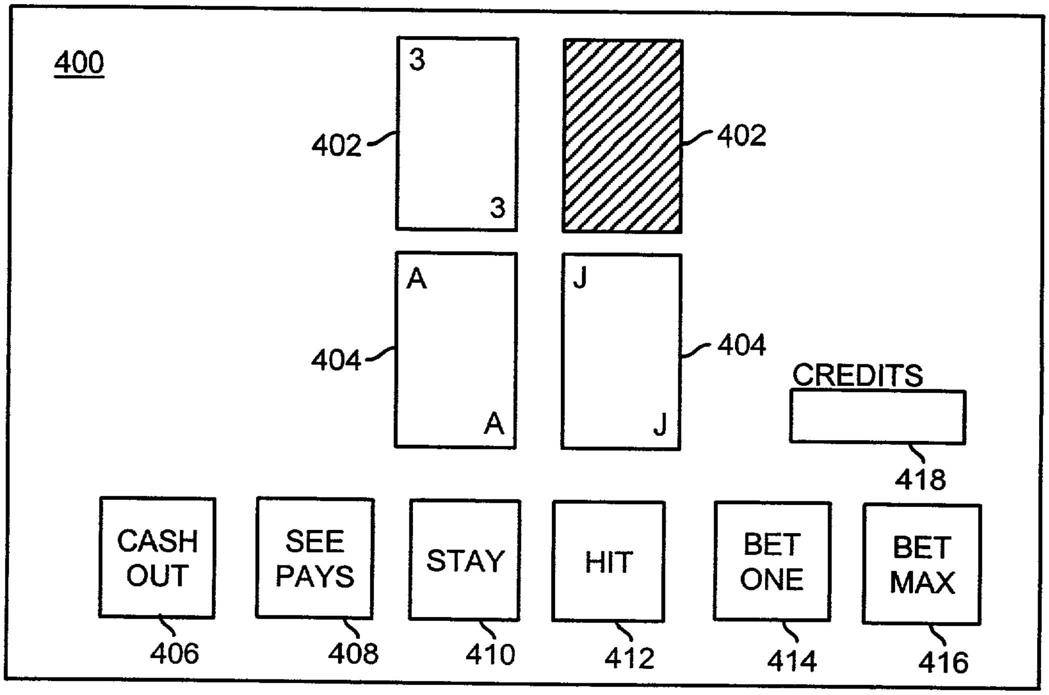
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 214 shown schematically in FIG. 5A. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
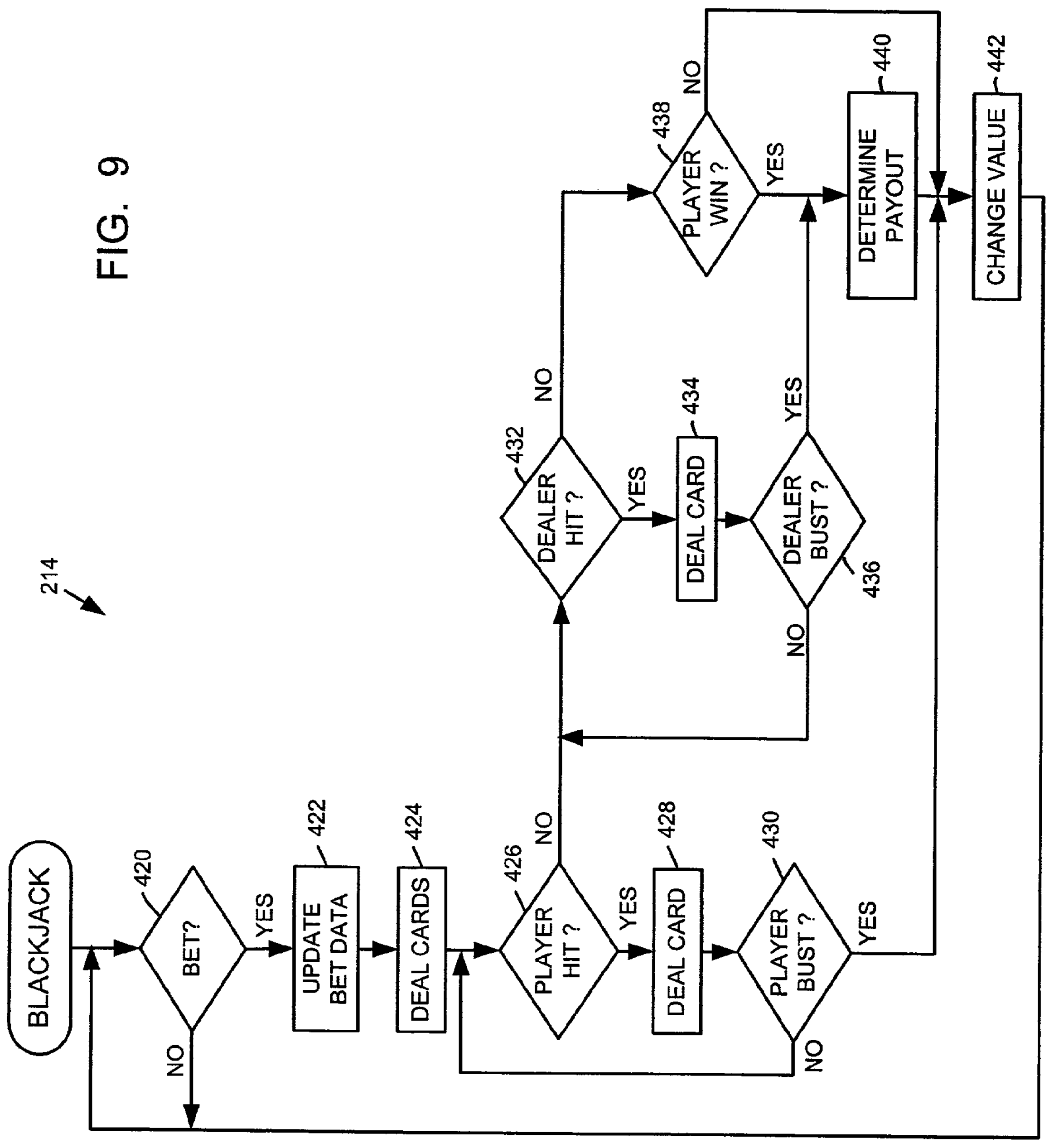
FIG. 9 is a flowchart of an embodiment of a video blackjack routine that may be performed by one or more of the gaming units.

FIG. 9 is a flowchart of the video blackjack routine 214 shown schematically in FIG. 5A. Referring to FIG. 9, the video blackjack routine 214 may begin at block 90 where it may determine whether a bet has been made by the player. That may be determined, for example, by detecting the activation of either the "Bet One Credit" button 414 or the "Bet Max Credits" button 416. At block 422, bet data corresponding to the bet made at block 90 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 216 shown schematically in FIG. 5A. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
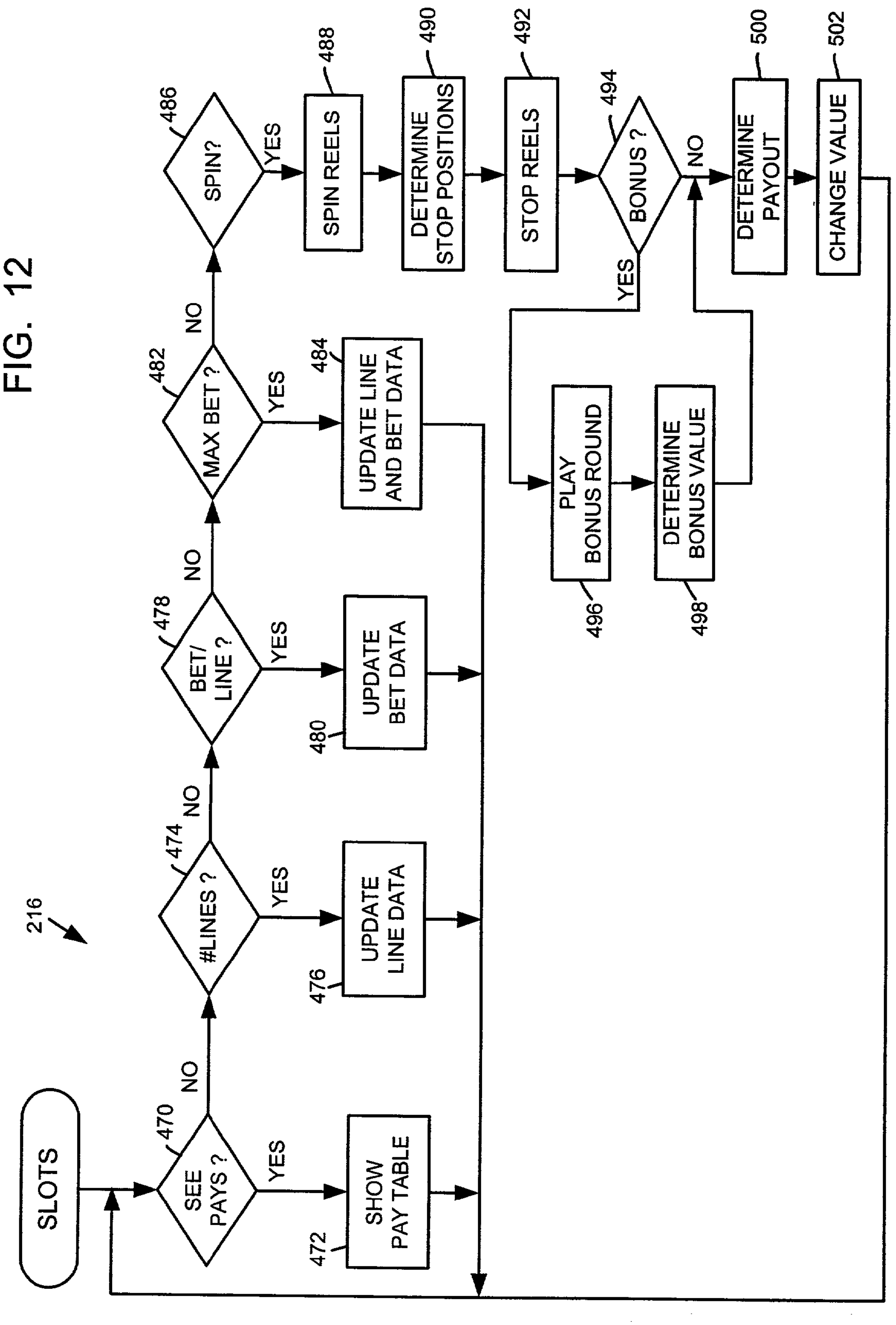
FIG. 12 is a flowchart of an embodiment of a slots routine that may be performed by one or more of the gaming units.

FIG. 12 is a flowchart of the slots routine 216 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 218 shown schematically in FIG. 5A. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
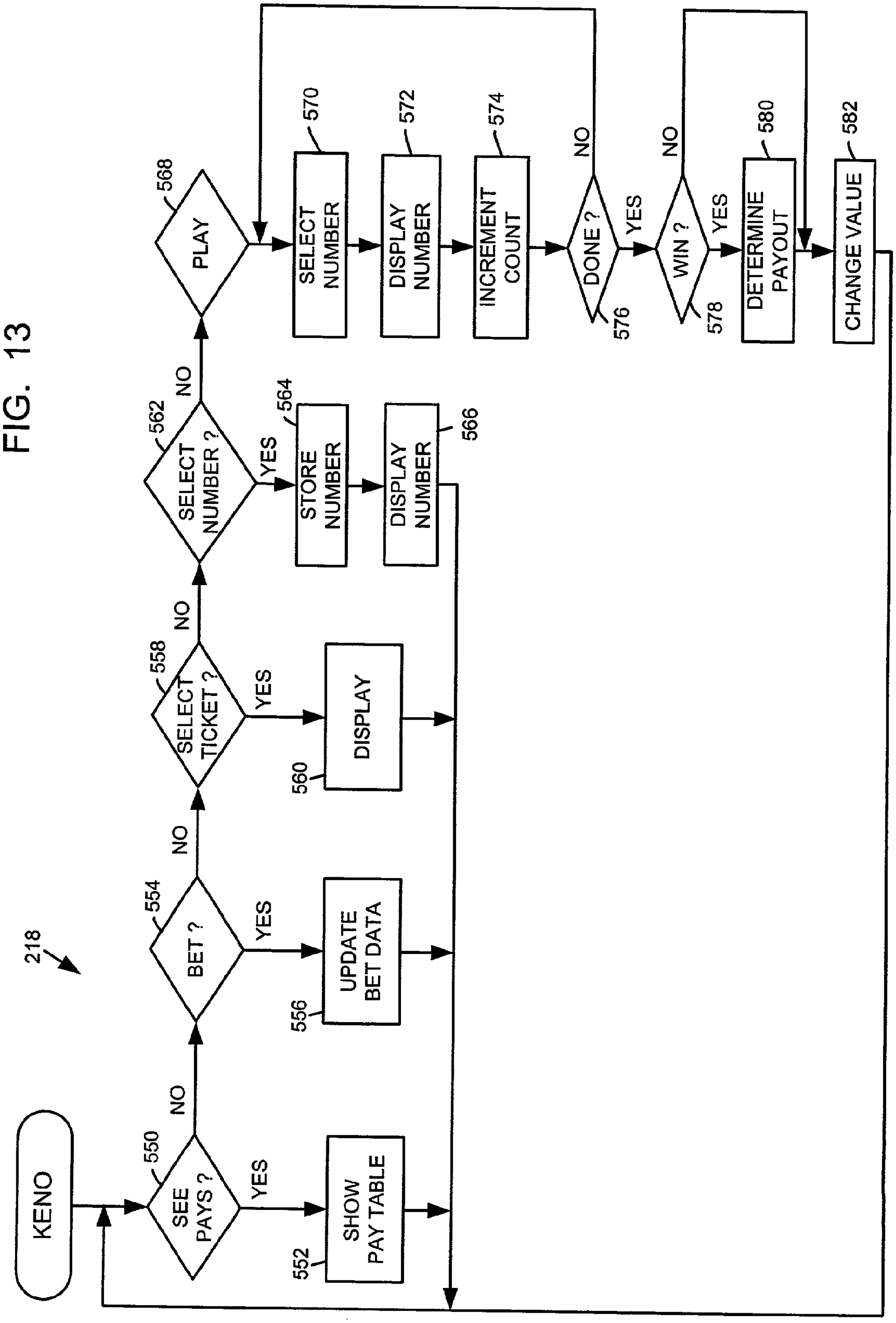
FIG. 13 is a flowchart of an embodiment of a video keno routine that may be performed by one or more of the gaming units.

FIG. 13 is a flowchart of the video keno routine 218 shown schematically in FIG. 5A. The keno routine 218 may be utilized in connection with a single gaming unit 20 where a single player is playing a keno game, or the keno routine 218 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino operator. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gaming units 20).

If play of the keno game is to begin as determined at block 568, at block 570 a game number within a range set by the casino operator may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
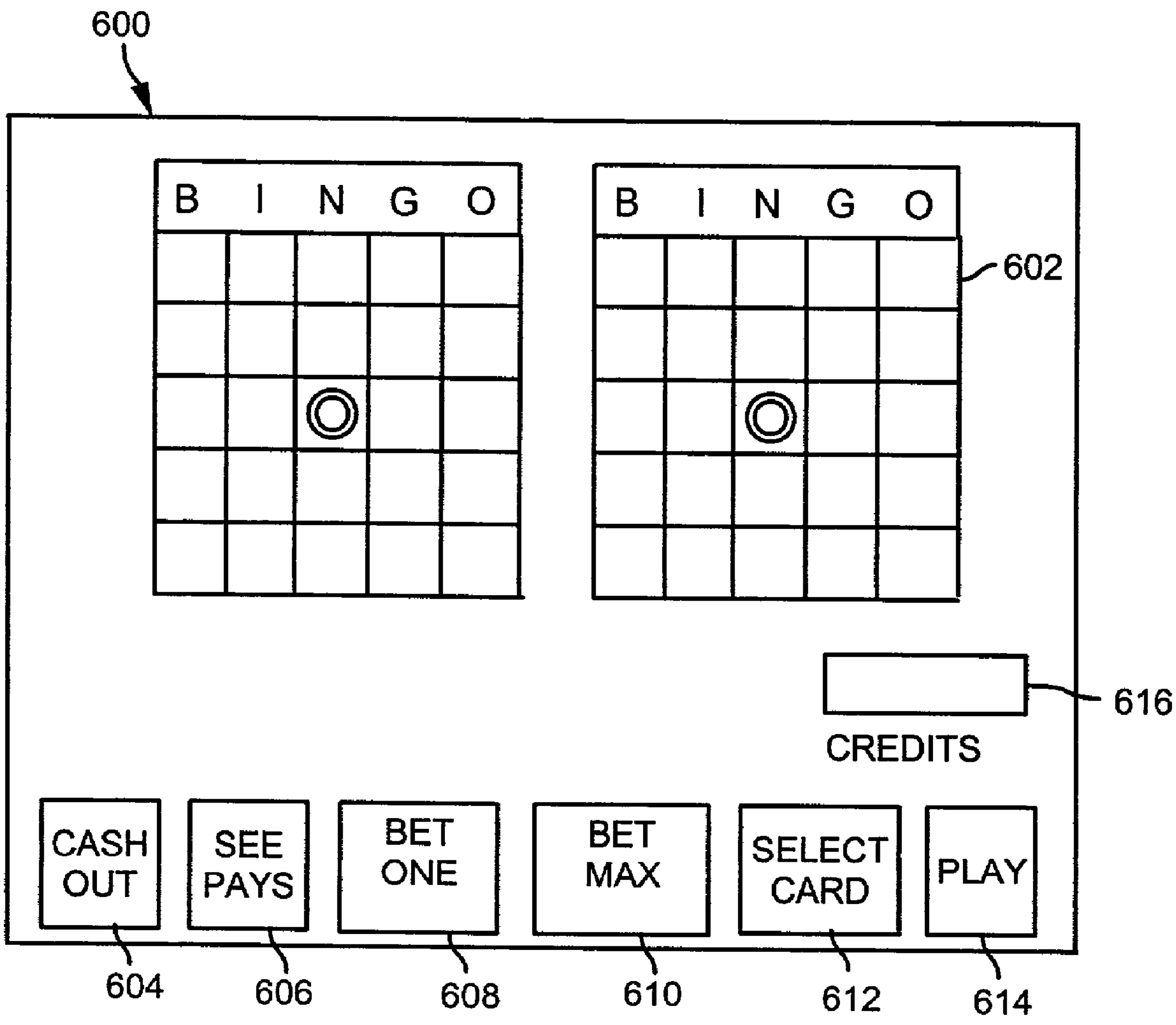
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 220 shown schematically in FIG. 5A. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
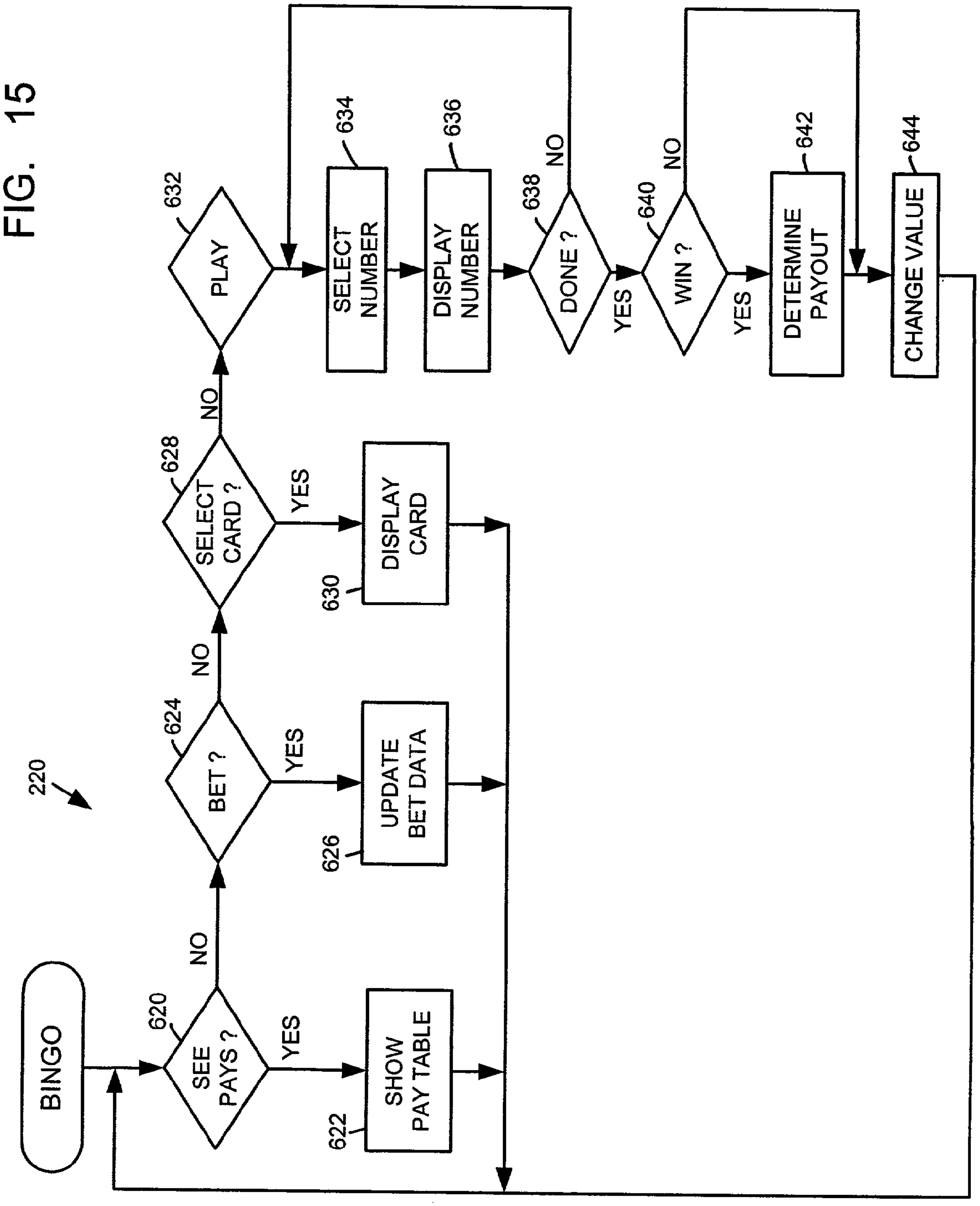
FIG. 15 is a flowchart of an embodiment of a video bingo routine that may be performed by one or more of the gaming units.

FIG. 15 is a flowchart of the video bingo routine 220 shown schematically in FIG. 5A. The bingo routine 220 may be utilized in connection with a single gaming unit 20 where a single player is playing a bingo game or the bingo routine 220 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

What is claimed is:

1. A gaming apparatus, comprising:

a housing;

a display unit that is capable of generating video images mounted in the housing;

a value input device mounted in the housing, the value input device being one of a coin acceptor, a paper currency acceptor, or a ticket reader/printer;

a value output device mounted in the housing;

a detection device operable to detect presence of a person and a direction in which the person is moving;

a timer circuit;

a controller operatively coupled to the display unit, the value input device, the value output device, the detection device and the timer circuit, the controller comprising a processor and a memory operatively coupled to the processor, the detection device comprising:

a motion detector having a first field of vision and a second field of vision, wherein the motion detector is operable to generate a first type of electrical pulse in response to detection of a person in the first field of vision, and further operable to generate a second type of electrical pulse in response to detection of a person in the second field of vision, the controller being programmed to determine, in response to the first type of electrical pulse being generated first, that the person is moving in a first direction, and further programmed to determine, in response to the second type of electrical pulse being generated first, that the person is moving in a second direction, and the controller being programmed to generate a signal indicating detection of a person in response to the first type of electrical pulse or the second type of electrical pulse;

the controller being programmed to determine that no person is within a determined distance of the gaming apparatus in response to a failure to detect a person during a first time interval, the controller being programmed to allow a person to make a wager via the value input device, the controller being programmed to cause a video image to be generated on the display unit, the video image representing a game, the controller being programmed to determine a value payout associated with an outcome of the game represented by the video image and to provide the value payout via the value output device;

the controller being programmed to cause the timer circuit to measure a period of time after the detection device determines that no person is within the determined distance of the gaming apparatus;

the controller being programmed to compare the period of time to a predetermined time duration;

the controller being programmed to cause the gaming apparatus to enter a sleep mode after the period of time equals the predetermined time duration in which power supplied to a plurality of different components of the gaming apparatus is reduced;

the controller being programmed to cause the gaming apparatus to terminate the sleep mode when the detection device detects a person, to cause power to the plurality of different components of the gaming apparatus to be increased; and the controller being programmed to vary the predetermined time duration throughout the day.

2. A gaming apparatus as defined in claim 1, wherein the gaming apparatus additionally comprises a color video display unit and wherein the controller is programmed to cause the color video display unit to power down in response to the gaming apparatus entering the sleep mode.

3. A gaming apparatus as defined in claim 1, wherein the gaming apparatus additionally comprises a color video display unit and wherein the controller is programmed to cause the color video display unit to power up in response to the gaming apparatus terminating the sleep mode.

4. A gaming apparatus as defined in claim 1, wherein the gaming apparatus additionally comprises at least one video driver and wherein the controller is programmed to cause the video driver to power down in response to the gaming apparatus entering the sleep mode.

5. A gaming apparatus as defined in claim 1, wherein the gaming apparatus additionally comprises at least one video driver and wherein the controller is programmed to cause the video driver to power up in response to the gaming apparatus terminating the sleep mode.

6. A gaming apparatus as defined in claim 1, wherein the gaming apparatus additionally comprises a color video display unit, a video driver, a fluorescent light and a hard drive and wherein:

the controller is programmed to cause the color video display unit to power down in response to entering the sleep mode;

the controller is programmed to cause the video driver to power down in response to entering the sleep mode;

the controller is programmed to cause the fluorescent light to power down in response to entering the sleep mode; and the controller is programmed to cause the hard drive to power down in response to entering the sleep mode.

7. A gaming apparatus as defined in claim 1, the gaming apparatus additionally comprises a color video display unit, a video driver, a fluorescent fight and a hard drive and wherein:

the controller is programmed to cause the hard drive to power up in response to terminating the sleep mode;

the controller is programmed to cause the fluorescent light to power up in response to terminating the sleep mode;

the controller is programmed to cause the video driver to power up in response to terminating the sleep mode; and the controller is programmed to cause the color video display unit to power up in response to terminating the sleep mode.

8. A gaming apparatus as defined in claim 1, wherein:

the controller being programmed to cause a video image associated with a game to be generated on the display unit, the video image representing one of the following games: video poker, video blackjack, video slots, video keno and video bingo, the video game image comprising an image of at least five playing cards if the game comprises video poker, the video game image comprising an image of a plurality of simulated slot machine reels if the game comprises video slots, the video game image comprising an image of a plurality of playing cards if the game comprises video blackjack, the video game image comprising an image of a plurality of keno numbers if the game comprises video keno, and the video game image comprising an image of a bingo grid if the game comprises video bingo.

9. A gaming system comprising a plurality of gaming apparatuses as defined in claim 1, said gaming apparatuses being interconnected to form a network of gaming apparatuses.

10. A gaming system as defined in claim 9, wherein said gaming apparatuses are interconnected via the Internet.

11. A gaming apparatus as defined in claim 1, wherein the detection device is capable of detecting a person without physical contact between the gaming apparatus and the person.

12. A gaming apparatus as defined in claim 11, wherein the detection device is capable of detecting motion of the person.

13. A gaming apparatus as defined in claim 11, wherein the detection device is capable of detecting radiation from the person.

14. A gaming apparatus as defined in claim 1, wherein the gaming apparatus additionally comprises:

an amplifier device operably connected to the motion detector, the amplifier device having a relatively high alternating current (AC) gain and a relatively low direct current (DC) gain to filter out electrical pulses flowing in a constant direction and thereby reject a situation in which the person is detected but not moving;

a first comparator device operably connected to the amplifier device and operable to detect the first type of electrical pulse and, in response to detection of the first type of electrical pulse, further operable to generate a first output signal indicating detection of a person in the first field of vision;

a second comparator device operably connected to the amplifier device and operable to detect the second type of electrical pulse and, in response to detection of the second type of electrical pulse, further operable to generate a second output signal indicating detection of a person in the second field of vision, the controller being programmed to determine, in response to the first output signal being generated first, that the person is moving in the first direction, and further operable to determine, in response to the second output signal being generated first, that the person is moving in the second direction; and an OR device operably connected to the first comparator device and to the second comparator device, wherein the OR device is operable to generate the signal indicating detection of the person in response to the first output signal or the second output signal.

15. A gaming apparatus as defined in claim 14, wherein the first type of electrical pulse has positive polarity, and the second type of electrical pulse has negative polarity.

16. A gaming apparatus as defined in claim 1, wherein the first type of electrical pulse has positive polarity, and the second type of electrical pulse has negative polarity.

* * * * *